3,270,032
FOAM STABILIZER OIL

William E. Erner, Wilmington, Del., assignor to Air Products and Chemicals, Inc., Philadelphia, Pa., a corporation of Delaware
No Drawing. Filed July 25, 1963, Ser. No. 297,672
4 Claims. (Cl. 260—326.5)

This invention relates to stabilizers adapted to aid the development of foam characteristics in relatively inflexible macromolecular organic material such as rigid insulation board.

Heretofore, a variety of compositions have been developed for preparing plastic foam articles, and such formulations have generally included a surfactant adapted to stabilize the foam structure. Such surfactants or foam stabilizers control the uniformity of cell size, regulate cell structure, modify the tensile strength, and affect other characteristics of the foam composition, which characteristics are different during the initial stages of the development of gas bubbles in the precursor composition from the characteristics after the growth into the larger gas bubbles (generally called the pores) of the plastic foam. After the desired density has been attained the characteristics of the macromolecular structural material undergo still further changes until a plastic foam develops from the successive stages of precursor compositions. The function of the foam stabilizer is that of modifying both the viscosity and the surface tension of the precursor to enhance the probability of retention of the gas in each small gas bubble initially formed. The wall of each pore is modified because of its foam stabilizer component as the viscosity and strength of the precursor increases during the development of sufficient strength to minimize the likelihood of collapse or shrinkage of the foam. Some plastic foams suitable as cleaning pads, packing material and the like, can function well with the wide dispersion of cell size typical of Swiss cheese, natural sponges, etc. However, uniformity of cell size is an extremely important requirement in products such as rigid insulation board, sliced slabs, and items cut from foam slabs. Foam stabilizers are employed in insulation board manufacture primarily to assure such uniformity of cell size. During the development of the present invention, it was discovered that there was a positive correlation between the effectiveness of a foam stabilizer in improving the relative, empirical property of uniformity of cell size and the more precisely measurable property of percentage of gas retention in the foam.

In accordance with the present invention, an oil of moderate viscosity adapted especially to serve as a foam stabilizer is prepared by bringing about the co-polymerization of a precursor consisting of from 1 mol percent to 35 mol percent of a mercaptan and/or alcohol chain transfer agent and from 65 mol percent to 99 mol percent of a mixture of a plurality of monomeric components, one monomer being in the nature of an internal plasticizer having a group of at least four carbon atoms extending from a polymerizable ethylenic group, one monomer being a relatively compact molecule in which each group extending from the polymerizable ethylene group has not more than two carbon atoms, and one monomer being miscible with water by reason of having a water-solubilizing group extending from the polymerizable ethylenic group, each monomer constituting at least 17 mol percent (one-sixth) but less than 67 mol percent (two-thirds) of the molar proportions of the monomeric mixture. Although the composition resulting from the co-polymerization is effective in imparting significant viscosity (i.e., acting as a thickening agent) to polyol systems such as polypropyleneglycol, its principal utility is attributable to its effectiveness in stabilizing foam compositions comprising polyurethane structures so that at least 65% of the gas generated during polyurethane foaming is retained in the polyurethane foam and so that the cell size is substantially uniform instead of being widely dispersed.

Mercaptans and/or alcohols, when employed as chain transfer agents in precursors for co-polymerization products, make feasible the attainment of stable products having average molecular weights lower than might otherwise be obtained. Mercaptans and alcohols can serve as such chain transfer agents. Ether groups are sometimes incorporated into the structure by the participation of alcohols in the co-polymerization reactions. High molecular weight water soluble alcohols (generally most used as non-ionic wetting agents) are especially desirable as chain transfer agents for the co-polymerization reactions of the present invention. Such an alcohol may be prepared by treating nonylphenol $$(nC_9H_{19}C_6H_4OH)$$

with an alkylene oxide such as ethylene oxide to provide a polyoxyethylene derivative of nonylphenol, many of the molecules having 9 and many of the molecules having 10 oxyalkylene groups, and some molecules having more or less than such typical numbers, the distribution of the polyether groups providing an average of 9.5 alkylene oxide groups. When ethylene oxide is employed, a typical molecule might have a formula such as

$$H_{19}C_9C_6H_4O(CH_2CH_2O)_8CH_2CH_2OH$$

which has an empirical formula indicated by $C_{33}H_{60}O_{10}$. Such polyoxyethylene derivatives of nonylphenol are marketed as nonionic wetting agents for incorporation in dishwashing liquids and cleaners. The term "nonylphenylpolyoxyethyleneethanol" designates such a product.

Co-polymerization of the specified mixture of monomers and high molecular weight alcohols provides products having especially desirable properties for a foam stabilizer inasmuch as the catalytic polymerization is significant while the wetting agent functions partly as a chain transfer agent for preventing development of excessively high molecular weights and partly as a reaction solvent having such low volatility that it is not necessary to remove such solvent.

Mercaptans are also effective as chain transfer agents. A precursor containing as little as 1 mol percent mercaptan can produce an oily co-polymer having an acceptable viscosity at polymerization conditions so severe that in the absence of the mercaptan, solids and/or viscous resins of excessive molecular weight might result.

The mol concentration of catalyst in the total formulation for the precursor should be within the range generally employed in making oily co-polymers, such as of the general magnitude of 0.1%. It is sometimes desirable to employ a polyalkyleneether of an alkylphenol as the solvent for the catalyst. For example, a solution containing 2% azobisisobutyronitrile in nonylphenylpolyoxyethyleneethanol can be added dropwise to a well-stirred reaction mixture during the co-polymerization reaction to maintain the desired rate of co-polymerization.

The nature of the invention is further clarified by reference to a plurality of examples.

Example I

The proportions for a formulation for a precursor for this example should be:

| Mol percent— | | Mols |
|---|---|---|
| 22.1 | N-vinylpyrrolidone | 1 |
| 22.1 | dibutyl ester of maleic acid | 1 |
| 44.2 | vinyl acetate chain transfer agents | 2 |
| 8.8 | nonylphenylpolyoxyethyleneethanol | 0.4 |
| 2.7 | dodecyl mercaptan | 0.12 |
| 0.1 | catalyst | 0.001 |
| 100.0 | Totals | 4.521 |

A batch of foam stabilizer embodying such proportions was prepared by the mixing of:

| | Pounds |
|---|---|
| N-vinylpyrrolidone | 17.2 |
| Vinyl acetate | 26.8 |
| Dibutyl maleate | 35.4 |
| Nonylphenylpolyoxyethyleneethanol | 32.7 |
| Dodecyl mercaptan | 3.7 |
| Catalyst solution of azobisisobutyronitrile | 0.139 |
| dissolved in nonylphenylpolyoxyethyleneethanol | 7.3 |

The temperature was maintained in the range from about 75° C. to about 90° C., during the four hours of copolymerization. The catalyst solution was added during the first three hours. The co-polymer was vacuum flashed at 50° C. to remove 1.3 pounds of unreacted vinyl acetate. The product was a viscous oil, and retained its initial viscosity during prolonged storage at ambient conditions.

Samples of the vinyl type of foam stabilizer thus produced were tested in the preparation of rigid polyurethane insulation panels and compared with similar panels prepared using conventional polyoxyethylene silicones (water soluble type) foam stabilizers. The K factor undergoes modifications during the early period after the manufacture of an insulation board, tending to be lower initially, and higher after a period of hours. Exact comparison between the K factors of the insulation boards prepared from the two kinds of stabilizer were not possible because it happened that the only measurements of the K factors of the different boards were taken after different durations of storage. However, the data indicate that commerically acceptable insulation board can be manufactured utilizing the vinyl co-polymer type of foam stabilizers of the present invention, and that certain of the properties of the insulation board are superior to those obtained when the silicone foam stabilizer is employed.

In one set of tests, the rigid foam was prepared from a formulation consisting of 0.3 part of foam stabilizer per 100 parts of polyol, crude tolylene diisocyanate, dimethylethanolamine, dibutyl tin dilaurate, a polyalkyleneether polyol marketed as Dow RS–375, and trichlorofluoromethane. The resulting insulation boards had the following characteristics:

| | Foam stabilizer type | |
|---|---|---|
| | Silicone | Vinyl |
| Density in pounds, per cubic foot | 2.10 | 2.06 |
| Compressive strength, p.s.i.: | | |
| Parallel to facing sheets | 32 | 26 |
| Perpendicular to facing sheets | 19 | 18 |
| Cell size, cells per linear inch | 68 | 69 |
| Percent closed cells | 94 | 94 |
| K factor, B.t.u./hr./sq. ft./° F./in | 0.121 | [1] 0.129 |

[1] After 12 hours.

The same ingredients were employed in insulation boards containing 0.5 instead of 0.3 part of foam stabilizer, with the following results:

| | Foam stabilizer type | |
|---|---|---|
| | Control Silicone | Invention Vinyl |
| Density in pounds per cubic foot | 2.12 | 2.08 |
| Compressive strength, #/sq. in.: | | |
| Parallel to facing sheets | 31 | 23 |
| Perpendicular to facing sheets | 23 | 18 |
| Cell size, cells per linear inch | 75 | 77 |
| Percent closed cells | 87 | 97 |
| K factor, B.t.u./hr./sq. ft./° F./in | 0.121 | [1] 0.127 |

[1] After 12 hours.

By reason of the commercial acceptability of the insulation panels incorporating a foam stabilizer derived from a co-polymer of vinyl pyrrolidone, the effectiveness of vinyl pyrrolidone as the water-miscible monomer in the precursor was deemed established. However, similar copolymer oils substituting styrene for the vinyl pyrrolidone are ineffective as foam stabilizers, thus establishing the criticality of the water-miscible monomer in the precursor.

Example II

A batch of foam stabilizer is prepared embodying the following proportions:

| | Pounds |
|---|---|
| N-vinylpyrrolidone | 17.2 |
| Vinyl acetate | 26.8 |
| Dibutyl maleate | 35.4 |
| Nonylphenylpolyoxyethyleneethanol | 32.7 |
| Dodecyl mercaptan | 3.7 |
| Azobisisobutyronitrile | 0.14 |

Thus, the proportions are the same as in Example I, but a different mixing procedure is employed. All of the catalyst is initially dissolved in the mixed chain termination agents. The mixed monomers are added dropwise during a several hour period while stirring the reaction mixture and heating at 80–100° C. Chain length is restricted by both the presence of the chain transfer agents and by the flash polymerization attributable to the high concentration of catalyst relative to the incremental aliquot of fresh monomer. The co-polymer is vacuum flashed at 90° C. to remove about 5 pounds of unreacted monomer, consisting predominantly of vinyl acetate. The viscous product is stable during prolonged storage on the shelf, and functions as a foam stabilizer substantially equivalent to that of the fresh foam stabilizer prepared in accordance with Example I.

Example III

In preparing a batch of foam stabilizer, the total proportions among the starting materials are:

| | G. |
|---|---|
| 1.5 mols N-vinyl pyrrolidone | 165.5 |
| 3 mols vinyl acetate | 258 |
| 1.5 mols dibutyl maleate | 342 |
| 1.25 mols nonylphenylpolyoxyethyleneethanol | 770 |
| 0.06 mol t-dodecyl mercaptan | 36 |
| Azobisisobutyronitrile | 12 |

A flask equipped with heating mantle, stirrer, reflux condensor, and funnel for addition of reactant was employed for the reaction. All of the 770 g. of polyethyleneether of nonylphenol was placed in the flask together with 5 g. of Vazo brand of azobisisobutyronitrile. A mixture of the mercaptan and ethylenic type monomers was prepared, amounting to 801.5 g., of which about ⅓, or about 260 g. was added to the nonylphenylpolyoxyethyleneethanol and the reaction mixture heated to about 95° C. for one hour to promote a dilute phase co-polymerization influenced significantly by the alcohol groups of the solvent. A 5 g. aliquot of catalyst was added to the remaining monomers. During the second hour, the major amount (541.5 g.) of the cool mixture of mercaptan, monomers and 5 g. of azobisisobutyronitrile was added dropwise to the hot solution of the co-polymer to promote a flash co-polymerization of each incremental aliquot of monomer. The final 2 g. of azobisisobutyronitrile was added in several aliquots during the third hour, and the mixture was heated at about 95° C. during the fourth and fifth hours. The product was processed at 23 mm. absolute pressure and about 95° C. to remove about 66 g. of volatilizable material, predominantly vinyl acetate, thus utilizing about 192 (about 2.2 mols) of vinyl acetate in the co-polymer. The thus degassed oil had a Brookfield viscosity of 6,000 centipoise at 25° C., and a flash point (Cleveland open cup) above 440° F. This 6,000 cp. oil proved to be very effective as a foam stabilizer during the preparation of a test panel of rigid polyurethane insulation using Nacconate 4040 as the isocyanate and Atlas G–2410 polypropyleneether of sorbitol as the polyol. The stabilizer also proved to have good shelf life and other desiderata for a foam stabilizer.

*Example IV*

The precursor for the co-polymer had the following composition.

| Mol percent: | G. |
|---|---|
| 23.3 (0.2 mol) N-vinyl pyrrolidone | 22.2 |
| 23.3 (0.2 mol) dibutyl maleate | 45.6 |
| 52.4 (0.45 mol) vinyl acetate | 38.0 |
| 1.0 (0.0085 mol) decyl mercaptan | 1.5 |
| Azobisisobutyronitrile | 2.0 |

During the co-polymerization reaction, 100 ml. of acetone were added as a reflux solvent to moderate the reaction. The product was a viscous polymer which was dispersible in acetone.

A rigid polyurethane foam was prepared from a formulation consisting of:

| | G. |
|---|---|
| Voranol RN–600 brand of polyoxypropyleneglycerol | 16 |
| G–102 brand of quasi-prepolymer | 100 |
| Freon 11 brand of trichlorofluoromethane | 35 |
| Above described foam stabilizer | 2 |

The foaming reaction proceeded satisfactorily and the resulting insulation panels met the standard requirements for plastic insulation.

*Example V*

The plasticizing component of the precursor may be butyl acrylate instead of dibutyl maleate. A composition is prepared by co-polymerization of a precursor consisting of:

| Mol % | Mols | Component | Grams |
|---|---|---|---|
| 23.0 | 0.4 | N-vinyl pyrrolidone | 42.9 |
| 28.8 | 0.5 | n-butyl acrylate | 71.3 |
| 40.2 | 0.7 | vinyl acetate | 60.7 |
| 8.0 | 0.14 | nonylphenylpolyoxyethyleneethanol | 85.0 |
| | | catalyst for vinyl polymerization | 3.0 |
| | 1.74 | | |

During the co-polymerization reaction the presence of about 100 ml. (about 30–40% by weight of the precursor) of acetone permitted easier stirring of the mixture, the acetone being removed by distillation after the exhaustive catalytic co-polymerization to prepare a foam stabilizer of the present invention.

The effectiveness of the vinyl type stabilizer derived from butyl acrylate is tested by using 1.6 g. of the foam stabilizer in a composition consisting of:

| | G. |
|---|---|
| Voranol RN–600 brand of polyoxypropyleneglycerol polyol | 61 |
| G–102 brand of polyisocyanate quasi-prepolymer | 100 |
| Trichlorofluoromethane | 35 |
| Triethylenediamine catalyst | 0.8 |
| Foam stabilizer | 1.6 |

The foam rises smoothly and hardens into a uniform rigid polyurethane foam having excellent texture.

*Example VI*

A foam stabilizer was prepared by mixing one mol of O-methyl N-methallyl urethane (water-miscible monomer), 2 mols of vinyl acetate (compact monomer), one mol of dibutyl maleate (plasticizing monomer) and 0.04 mol of decyl mercaptan (chain transfer agent). An inert gas was employed to minimize the concentration of sorbed oxygen and the compositon was co-polymerized at 80° C., for 72 hours, the polymerization being catalyzed by diazobisisobutyronitrile. This foam stabilizer was a straw-colored viscous liquid suitable for use in rigid polyurethane foam formulations normally requiring a silicone type of foam stabilizer. The urethane groups of the three component co-polymer were present as side chains, necessitating the designation as a graft polyurethane instead of block polyurethane. The formulation for making the polyurethane included 1.5 g. of said foam stabilizer resulting from the co-polymerization reaction and 35 grams of Freon 11 brand of trichlorofluoromethane, 0.8 g. of triethylenediamine catalyst, 61.4 g. polyoxypropyleneglycerol (available as Voranol RN–600) and 100 g. of a polyfunctional, polynuclear aromatic isocyanate (e.g., a quasi-prepolymer marketed as G–102) added to the premixed other ingredients. The reaction mixture was stirred for 15 seconds and poured into a mold in which the precursor was transformed into rigid foam having satisfactory properties.

*Example VII*

The preparation of a graft polymer comprising a plurality of urethane side chains can be conducted conveniently in a solvent such as dimethyl sulfoxide. Moreover, dimethyl sulfoxide is a satisfactory solvent for the preparation of certain methylurethanes from reactants such as organic chlorides, alkali cyanates, and methanol. A mixture of 1 mol of methylallyl chloride and 1 mol of methyl alcohol was added slowly to a solution of 1 mol of potassium cyanate in dimethyl sulfoxide while maintaining the reaction temperature at 100° C., thus preparing methylallyl urethane. A co-polymerization of 3 monomers was conducted in the same dimethyl sulfoxide solvent by adding to the cooled solvent 2 mols of vinyl acetate, 1 mol of dibutyl maleate, and 0.04 mol of decyl mercaptan and thereafter adding a catalytic amount of diazoisobutyronitrile and heating to 90° F. for co-polymerization. The co-polymer resulting from the inter action of the 3 monomers was purified by filtration and distillation to remove the dimethyl sulfoxide solvent and unreacted components. The co-polymer was an oily liquid of medium viscosity. Subsequent tests established that said co-polymer was effective as a foam stabilizer for rigid polyurethane foam.

A rigid polyurethane foam was prepared by interaction among the ingredients of a formulation consisting of:

| | G. |
|---|---|
| Foam stabilizer (supra) | 2 |
| G–102 quasi-prepolymer | 100 |
| Voranol RN–600 brand of polyol | 61 |
| Triethylenediamine catalyst | 2.4 |
| Trichlorofluoromethane | 35 |

The composition underwent the polyurethane development to become a foam which had properties as satisfactory as similar compositions comprising silicone foam control agents, and permitted the preparation of low density polyurethane foam having characteristics especially useful for insulation board.

*Example VIII*

In manufacture of polyurethane foams, the foam stabilizer is dissolved in another one of the components. It is convenient to prepare as large batches of such mixtures as feasible, but precautions must be taken because the silicone type of foam stabilizer decomposes in solution within a few days or weeks.

Storage stability tests were conducted on the foam stabilizer of Example I, and it was found that a solution of the foam stabilizer in polyol could be stored for 4 days at daily peak temperatures of about 100° F. without measurably impairing the effectiveness of said foam stabilizer. Similar tests on polyol solutions of the vinyl type foam stabilizers stored for 30 days of summer temperatures proved that good insulation boards could be manufactured even with such well aged solutions.

*Example IX*

Previous chemists have noted that 3-sulfolene, the 5-membered ring resulting from the reaction of butadiene and sulfur dioxide, does not readily polymerize by itself, but that it does co-polymerize with monomers suitable for homopolymerization. A series of foam stabilizers is prepared in which 3-sulfolene is the water-soluble monomer. Each such co-polymer is found to be an effective foam stabilizer.

A foam stabilizer is prepared by co-polymerization of:

| | G. |
|---|---|
| 0.5 mol 3-sulfolene | 61 |
| 1 mol vinyl acetate | 86 |
| 0.5 mol dibutyl maleate | 114 |
| 0.02 mol decyl mercaptan | 3 |
| Diazobisisobutylronitrile | 3 |

A foam is prepared having the following formulation:

| | G. |
|---|---|
| Voranol RN–600 brand of polyol | 61 |
| G–102 brand of quasi-prepolymer | 100 |
| Trichlorofluoromethane | 35 |
| Triethylenediamine | 0.8 |
| Foam stabilizer (supra) | 1.6 |

A satisfactory insulation board type of rigid polyurethane foam is produced. The texture and quality are substantially equivalent to those obtained using silicone type of foam stabilizer.

*Example X*

Foam stabilizers are prepared employing vinyl butyl ether instead of dibutyl maleate and/or dibutylfumarate in each of the previously considered formulations, and it is noted that the co-polymers are effective as foam stabilizers.

*Example XI*

A foam stabilizer is prepared on a continuous basis by pumping the components through a long coil positioned in a water bath maintained at 80° C. The heat of polymerization is about 100 kilocalories per kilogram of reaction mixture, so that water cooling is effective for controlling the reaction. Various modifications in the formulation are feasible without imposing barriers to the operativeness of the continuous production of the foam stabilizer by the isothermal co-polymerizaiton reaction in a thermostatically controlled water bath.

*Example XII*

A precursor consists of:

| | G. |
|---|---|
| 22.8 (0.5 mol) vinyl pyrrolidone | 55.5 |
| 22.8 (0.5 mol) vinyl isooctylether | 78 |
| 45.3 (1.0 mol) vinyl acetate | 86 |
| 9.1 (0.2 mol) nonylphenylpolyoxyethyleneethanol | 125 |
| Catalyst | 3 |

The precursor was polymerized at 90° C., for four hours, adding the catalyst intermittently. The vinyl isooctylether was prepared by treatment of a technical grade of isooctyl alcohol (from an oxo process) with acetylene at 160–180° C., at 240 p.s.i.g.

A rigid foam was prepared from a precursor containing the foam stabilizer and consisting of:

| | G. |
|---|---|
| Voranol RN–600 brand of polyoxypropylene glycerol | 61 |
| G–102 quasi-prepolymer | 100 |
| Trichlorofluoromethane | 35 |
| Triethylenediamine | 0.8 |
| Foam stabilizer | 1.6 |

The foam rose smoothly to provide a rigid foam having excellent texture.

By a series of procedures, it is established that the foam stabilizer must be prepared by the catalytic co-polymerization of a precursor composition consisting predominantly of a plurality of monomers having polymerizable ethylenic groups, from 17 mol percent to 67 mol percent of the monomers being water-miscible compounds having a water-solubilizing group, from 17 mol percent to 67 mol percent of the monomers being compounds conferring plasticizer function because of a group having at least 4 carbon atoms, from 17 to 67 mol percent of the monomers being compact compounds having not more than 2 carbon atoms in any group extending from the ethylene group, said precursor composition containing from 1 to 35 mol percent of chain transfer component adapted to restrict the co-polymerization reaction to form an oil, and said foam stabilizer being effective in modifying precursors for rigid polyurethane foam to permit retention of at least 65% of the gas volume generated during polyurethane foam formation.

Various modifications of the invention are possible without departing from the scope of the appended claims.

The invention claimed is:

1. A foam stabilizer oil prepared by the exhaustive catalytic co-polymerization of a precursor composition consisting predominantly of a plurality of monomers having polymerizable ethylenic groups, from 17 to 67 mol percent of the monomers being vinylpyrrolidone, from 17 to 67 mol percent of the monomers being butyl acrylate, and from 17 to 67 mol percent of the monomers being vinyl acetate, said precursor composition containing from 1 to 35 mol percent of chain transfer component selected from the group consisting of nonylphenylpolyoxyethyleneethanol and dodecyl mercaptan, said chain transfer component being adapted to restrict the copolymerization reaction, said foam stabilizer having a viscosity greater than about 2,000 but less than 200,000 centipoises, and said foam stabilizer being effective in modifying precursors for rigid polyurethane foam to permit retention of at least 65% of the gas volume generated during polyurethane foam formation.

2. A foam stabilizer oil prepared by the exhaustive catalytic co-polymerization of a precursor composition consisting essentially of from 65 to 99 mol percent of a monomeric mixture consisting of a plurality of monomers, from 17 mol percent to 67 mol percent of the monomers being compounds selected from the group consisting of vinyl pyrrolidone, methyl allyl urethane, and 3 sulfolene, from 17 mol percent to 67 mol percent of the monomers being plasticizing compounds having groups of at least 4 carbon atoms extending from polymerizable ethylenic groups, said plasticizing compounds being selected from the group consisting of dibutyl maleate, vinyl butyl ether, vinyl isooctylether, and butyl acrylate, and from 17 mol percent to 67 mol percent of the monomers being vinyl acetate, said precursor composition containing from 1 to 35 mol percent of chain transfer component selected from the group consisting of nonylphenylpolyoxyethyleneethanol and dodecyl mercaptan, said chain transfer component being adapted to modify the co-polymerization reaction sufficiently that the foam stabilizer has a viscosity greater than 2000 centipoises but to prevent development of a viscosity greater than 200,000 centipoises, 3. The foam stabilizer of claim 2 in which the monomer in the 65 to 99 mol percent monomeric mixture is vinylpyrrolidone.

4. A foam stabilizer oil prepared by the exhaustive catalytic copolymerization of a precursor composition consisting predominantly of a plurality of monomers having polymerizable ethylenic groups, from 17 to 67 mol percent of the monomers being vinylpyrrolidone, from 17 to 67 mol percent of the monomers being dibutyl maleate, and from 17 to 67 mol percent of the monomers being vinyl acetate, said precursor composition containing from 1 to 35 mol percent of chain transfer component selected from the group consisting of nonylphenylpolyoxyethyleneethanol and dodecyl mercaptan, said chain transfer component being adapted to restrict the copolymerization reaction, said foam stabilizer having a viscosity greater than about 2,000 but less than 200,000 centipoises, and said foam stabilizer being effective in modifying precursors for plastic foam to permit retention of a high proportion of the gas volume generated during foam formation.

References Cited by the Examiner
UNITED STATES PATENTS 3,143,513   8/1964   Day et al. _____ 260—80.5

ALEX MAZEL, *Primary Examiner.*

HENRY R. JILES, *Examiner.*

J. TOVAR, *Assistant Examiner.*